US010994344B2

(12) United States Patent
Atzori et al.

(10) Patent No.: US 10,994,344 B2
(45) Date of Patent: May 4, 2021

(54) DRILL COMPRISING MECHANICAL ELEMENTS FOR REGULATING THE LUBRICATION FLOW RATE ACCORDING TO THE CUTTING FORCES

(71) Applicant: SETI-TEC, Collegien (FR)

(72) Inventors: Pierre Alexis Atzori, Montry (FR);
Olivier Cresson, Mauperthuis (FR);
Jerome Petitgas, Moussy le Neuf (FR);
Sebastien Pereira, Charneca da Caparica (PT)

(73) Assignee: SETI—TEC, Collegien (FR)

( * ) Notice: Subject to any disclaimer, the term of this patent is extended or adjusted under 35 U.S.C. 154(b) by 0 days.

(21) Appl. No.: 16/045,135

(22) Filed: Jul. 25, 2018

(65) Prior Publication Data
US 2019/0030621 A1 Jan. 31, 2019

(30) Foreign Application Priority Data

Jul. 25, 2017 (FR) .................................... 1757072
Jul. 18, 2018 (EP) .................................... 18184257

(51) Int. Cl.
*B23Q 11/10* (2006.01)
*B23B 45/00* (2006.01)
(Continued)

(52) U.S. Cl.
CPC .............. *B23B 45/00* (2013.01); *B23Q 11/10* (2013.01); *B23Q 11/1092* (2013.01);
(Continued)

(58) Field of Classification Search
CPC ............ B23Q 11/1015; B23Q 17/0961; B23Q 11/1092; B23Q 11/10; B23B 2231/24;
(Continued)

(56) References Cited

U.S. PATENT DOCUMENTS 6,557,651 B1 * 5/2003 Norby .................... E21B 17/006
175/52
7,189,033 B2 * 3/2007 Nappier ................. B23Q 5/261
137/38
2015/0293518 A1 10/2015 Ramiere et al.

FOREIGN PATENT DOCUMENTS

DE 4339770 A1 5/1995
EP 2944420 A1 11/2015
(Continued)

OTHER PUBLICATIONS

French Search Report dated Apr. 6, 2018 for corresponding French Application No. 1757072, filed Jul. 25, 2017.
(Continued)

*Primary Examiner* — Eric A. Gates
*Assistant Examiner* — Paul M Janeski
(74) *Attorney, Agent, or Firm* — David D. Brush; Westman, Champlin & Koehler, P.A.

(57) ABSTRACT

A drill including a drill spindle capable of driving a cutting tool in movement. The drill has at least one channel for distributing a lubricant to the cutting tool, a pump to supply the channel with lubricant and control element(s) for controlling the flow rate of the pump. Such a drill further has mechanical element(s) for determining at least one piece of information representing the torque exerted on the spindle along its axis during drilling. The control element(s) act on the flow rate of the pump as a function of the torque exerted on the spindle along its axis during drilling.

12 Claims, 9 Drawing Sheets

(51) Int. Cl.
*B23Q 17/09* (2006.01)
*F16N 13/16* (2006.01)
*G05B 19/18* (2006.01)
B23B 45/04 (2006.01)
B23B 51/04 (2006.01)

(52) U.S. Cl.
CPC ......... *B23Q 17/0961* (2013.01); *F16N 13/16* (2013.01); *G05B 19/182* (2013.01); *B23B 45/04* (2013.01); *B23B 51/042* (2013.01); *B23B 2250/12* (2013.01); *F16N 2270/20* (2013.01); *G05B 2219/45129* (2013.01); *G05B 2219/49043* (2013.01)

(58) Field of Classification Search
CPC ....... B23B 51/042; B23B 45/00; B23B 45/04; B23B 2250/12; F16N 13/16; F16N 2270/20; G05B 19/182; G05B 2219/45129; G05B 2219/49043
See application file for complete search history.

(56) References Cited

FOREIGN PATENT DOCUMENTS

FR  2881366 A1  8/2006
FR  2943570 A1  10/2010

OTHER PUBLICATIONS

English translation of the Written Opinion of the French Searching Authority dated Apr. 6, 2018, for corresponding French Application No. 1757072.

\* cited by examiner

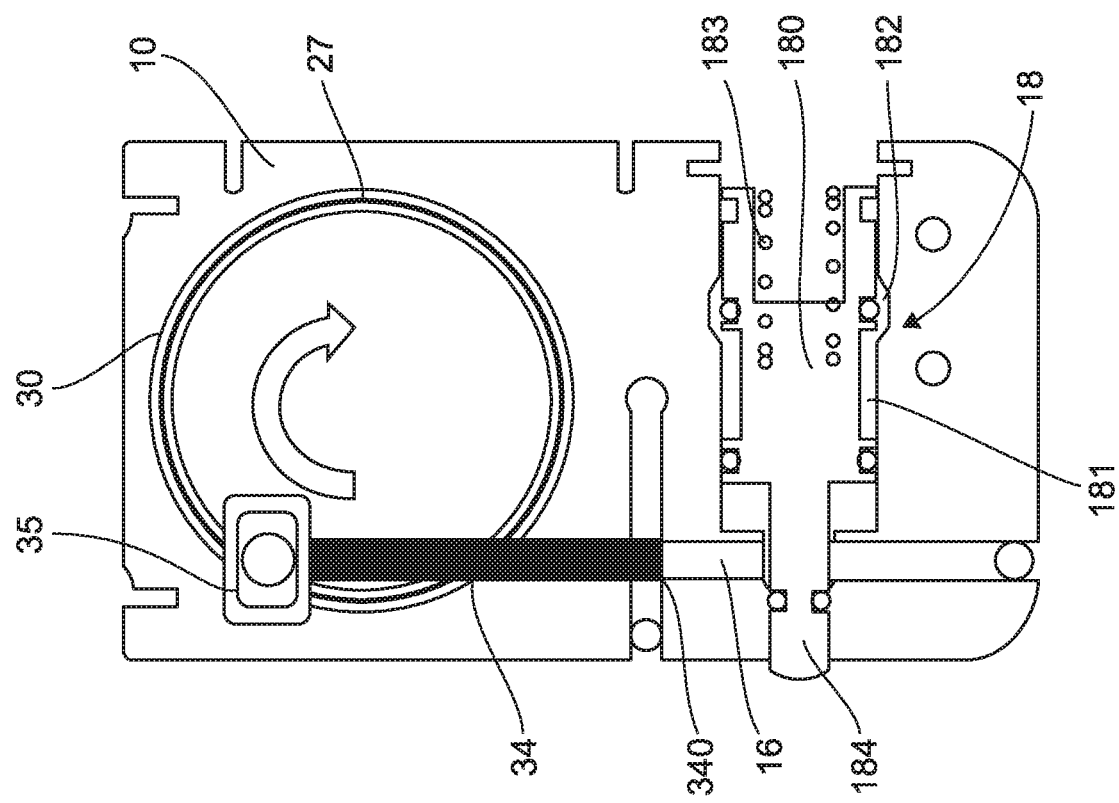
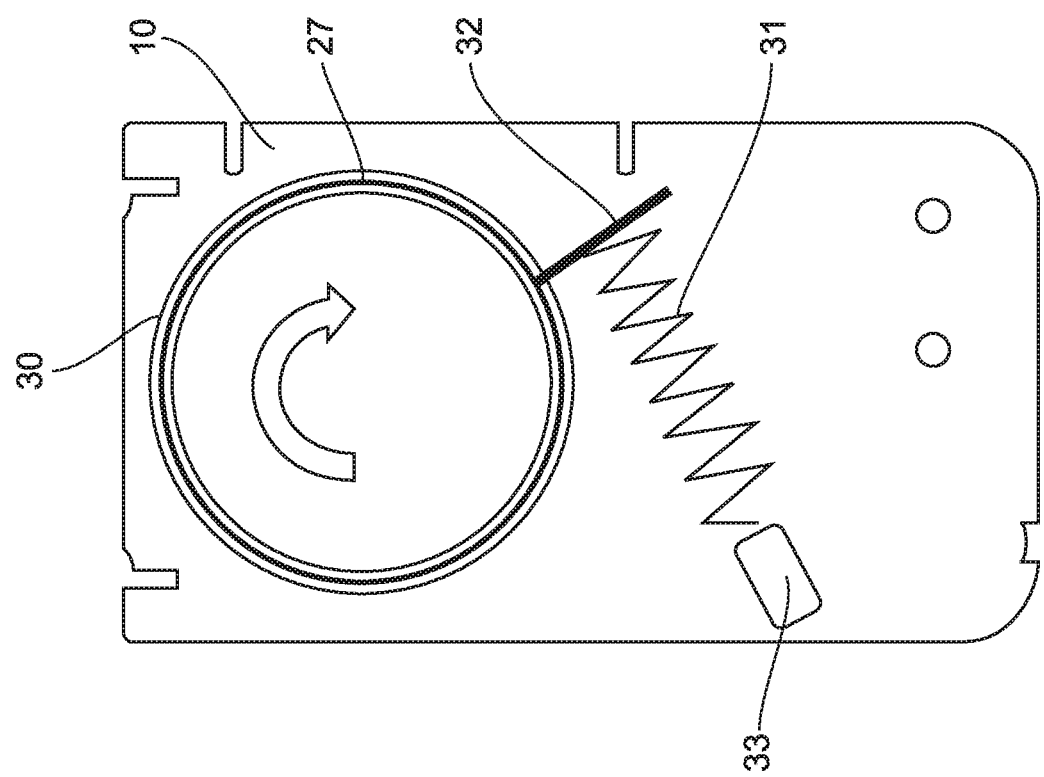

E-E

DRILL COMPRISING MECHANICAL ELEMENTS FOR REGULATING THE LUBRICATION FLOW RATE ACCORDING TO THE CUTTING FORCES

1. CROSS-REFERENCE TO RELATED APPLICATIONS

This Application claims priority to and the benefit of French Patent Application No. FR 1757072, filed Jul. 25, 2017, and European Patent Application No. 18184257, filed Jul. 18, 2018, the contents of which are incorporated herein by reference in their entireties.

2. FIELD OF THE INVENTION

The field of the invention is that of the designing and manufacture of drilling devices commonly known as drills.

The invention relates more particularly to controls on the lubrication, during drilling, of the cutting tool embedded in a drill.

3. PRIOR ART AND ITS DRAWBACKS

Drills are commonly used in industry to drill various elements. For example, drills are used in aeronautics to make bore holes in aircraft structures.

This sector uses especially what are called automatic feed drills, i.e. drills for which the drill spindle, which carries a cutting tool, is driven simultaneously in translation and in rotation along its longitudinal axis.

These drills are generally provided with a pneumatic motor to drive the drill spindle in motion. The document FR-A1-2 881 366 describes for example such a drill.

During a drilling operation, the cutting tool must be lubricated so as to facilitate the cutting of the material by the drill bit and cool this drill bit.

To this end, there are known pneumatic drills comprising a lubricant pump feeding a lubricant distribution channel, stretching through the drill spindle and leading into the interior of the cutting tool placed at its extremity. The cutting tool comprises lubricant distribution holes.

These pumps are generally of the piston type or else of the peristaltic type.

In order to work, in order to deliver a flow of lubricant, these pumps are supplied with compressed air. More particularly, the compressed air supply circuit of the motor of the drill has a bypass channel feeding the lubricant through a valve. The feed pressure of this pump can be reduced as compared with the flow rate of supply to the motor.

Classically, the lubricant pump is supplied with compressed air and delivers lubricant to the cutting tool when the drill is put into operation at a start of a cycle. It is no longer supplied with compressed air when the drilling cycle is completed. This is in order to stop the lubrication of the cutting tool. Thus, once the cutting tool is driven by a motion along its axis, it is fed with lubricant.

The drill can furthermore be equipped with a start button that enables an operator to activate the operation of the pump outside the drilling cycle and therefore outside the phases during which the drilling bit is driven along its axis by the drill. This enables the operator to carry out a risk-free check that the flow-rate of lubricant is accurate and truly reaches the lubrication channels of the cutting tool.

This start button incorporates a spring-based return device enabling it to return to its resting state when the operator stops the test. In the resting state, the valve is closed and the lubricant pump is stopped.

Once the start of the drill cycle is launched, a portion of the compressed air feeding the motor of the drill is deflected towards the lubricant feeding circuit of the pump so much so that the valve opens to feed the lubricant pump so that it distributes lubricant to the cutting tool.

In the field of aeronautics, the drills are generally fixedly attached to drilling screens fixed in proximity to the structure to be drilled and comprising a plurality of holes situated so as to be plumb with the zones to be drilled in the structure. To carry out a drilling at a hole of the drilling screen, the drill is fixedly attached thereto with fixed attachment means provided for this purpose and known to those skilled in the art. The drill is thus shifted from hole to hole on the screen to carry out a succession of drillings.

For certain drilling operations, the distance between the drilling screen and the material to be drilled is great. The result of this is that, during the approach phase, when the cutting tool moves from the drilling screen towards the structure to be drilled, and the withdrawal phase when the cutting tool moves from the drilled structure towards the drilling screen after drilling i.e. outside the drilling phases proper (namely phases for removing material), the cutting tool is fed with lubricant and sheds this lubricant unnecessarily. This is also true when the tip of the drill bit is led through the part to be drilled after carrying out a through-hole or through-drilling operation (through-drilling phase).

This excessive lubrication causes superfluous consumption of lubricant as well as a pollution of the drilling area, making it necessary to carry out cleaning operations and inducing additional costs.

Various approaches have been imagined to remove these problems. These are aimed at stopping lubrication during the approach, withdrawal and through-drilling exit phases.

A first solution consists in implementing a mechanical system at the end of the spindle with a spring countering the thrust of the spindle towards the part to be drilled. Then, lubrication is allowed beyond a certain thrust force. Here, the thrust of the drill bit is thus taken into consideration to determine whether or not the drilling bit is in cutting action. The compression of this spring prompts the activation of the compressed air supply valve for the pump so that this pump distributes lubricant to the cutting tool once the thrust on this tool along its axis reaches a certain predetermined threshold from which the drill is deemed to be in drilling action (removing of material).

This approach enables the distribution of lubricant to the drilling bit when it is really in drilling action and no longer in the approach, retraction or through-drilling exit phases. This reduces the consumption in lubricant and limits pollution of the drilling area and the costs inherent in this pollution.

This approach however has certain drawbacks, especially when carrying out a drilling operation known as vibratory feed drilling.

During certain drilling operations, it is necessary to enable the removal of chips, and drive the cutting tool with a feed motion known as a vibratory feed motion, i.e. a feed having an alternating component, for example a sinusoidal component inducing the breakage of the chips.

The use of a spring at the end of the spindle to detect a thrust on the cutting tool during a vibration drilling operation tends to dampen the vibration induced by the vibratory feed and at least partly inhibit the beneficial effects on the removal of chips, and this course is not desirable.

In a second approach, an electronic system is implemented to measure the flow rate of air consumed by the pneumatic motor of the drill and, as a function of this flow rate, control the compressed air supply valve for the motor and thus the distribution flow of the lubrication pump.

Since the consumption of the pneumatic motor is proportional to the load on the cutting tool, the lubrication is in principle implemented only when the flow rate of the motor reaches a threshold value beyond the drilling bit is considered to be truly in drilling action and no longer in the approach, retraction and through-drilling exit phases. This reduces the consumption of lubricant and limits the pollution of the drilling area and the costs inherent in it.

This solution however has a few drawbacks, especially:
the electronic calibration of the activation of the valve according to the air feed flow rate for the motor is difficult to obtain;
the fragility of the electronic circuitry in a difficult environment (which is more fragile than mechanical equipment).

The management of the lubrication of the cutting tool of a drill can be further improved.

4. SUMMARY

An exemplary aspect of the present invention relates to a drill comprising a drilling spindle capable of driving a cutting tool in movement, said drill comprising at least one channel for distributing a lubricant to said cutting tool, a pump to supply said channel with lubricant and means to control the flow rate of said pump.

According to an exemplary embodiment of the invention, such a drill comprises mechanical means for determining at least one piece of information representing the torque exerted on said spindle along its axis during drilling, said means for controlling said pump acting on the flow rate of said pump as a function of the torque exerted on said spindle along its axis during drilling.

Thus, an exemplary embodiment of the invention relies on an original approach that consists in regulating the flow rate of lubrication for the cutting tool on the basis of the torque exerted on said spindle along its axis during drilling, measured no longer by means of electronic components but by the implementing of mechanical means alone. An exemplary embodiment of the invention thus proposes a solution that is appreciably simpler and more robust than that of the prior art, especially in a hostile environment, and is equally efficient.

According to one possible variant, said means for determining are configured to evaluate said torque.

According to one possible variant, said pump is pneumatic and said control means comprise at least one valve for the supply of compressed air to said pump, said valve being mobile between at least:
one closed position in which said pump is not supplied with compressed air, and
one open position in which said pump is supplied with compressed air to distribute said lubricant in said distribution channel.

According to one possible variant, said means for determining are configured to detect the attaining by said torque of a pre-determined threshold, said means for controlling acting on said valve to make it pass into said open position when the torque exerted on said spindle is at least equal to said predetermined threshold and vice versa.

According to one possible variant, the degree of opening of said valve varies appreciably proportionately as a function of said torque.

According to one possible variant, a drill according to the invention comprises a motor provided with a rotor and a transmission having an input connected to said rotor and an output connected to said spindle to drive this spindle in motion along its axis, said means for determining at least one piece of information that represents the torque exerted on said spindle being placed in said transmission.

The transmission undergoes a torque proportional to the torque undergone by the spindle during a drilling operation. It is therefore easy to efficiently measure a piece of information representing the torque exerted on the spindle during a drilling operation.

According to one possible variant, said transmission comprises at least one epicyclic gear train provided with a ring, said ring being rotationally mobile within the casing of said drill between two extreme positions against the effect of the elastic return means, a rotation of said ring against the action of said elastic return means, under the effect of an increase in the torque exerted on said spindle, being accompanied by a shifting of said valve towards its open position and vice versa.

The ring supports a reaction torque proportional to its output torque from the drill, therefore proportional to the torque supported by the drilling bit at the level of the spindle and resulting from the cutting forces in the material. It is therefore possible to efficiently measure a piece of information at the ring representing the torque exerted on the spindle during a drilling operation.

According to one possible variant, said transmission comprises at least one epicyclic train provided with a planet carrier, said planet carrier being rotationally mobile inside the casing of said drill against the effect of elastic return means, a rotation of said planet carrier against the effect of said elastic return means under the effect of an increase in the torque exerted on said spindle being accompanied by a shifting of said valve towards its open position, and vice versa.

According to one possible variant, a drill according to the invention comprises a finger driven in motion by said ring or said planet carrier, said finger being mobile between at least:
a position for opening said supply channel for said pump, this position being taken when said ring or said planet carrier is situated in a position under the effect of a torque exerted on said spindle of a value at least equal to a predetermined threshold, and
a position for closing off said supply channel for said pump, this position being taken when said ring or said planet carrier is situated in a position under the effect of a torque exerted on said spindle of a value below said predetermined threshold.

In this embodiment, the finger prohibits or allows the circulation of compressed air towards the valve to deliver or not deliver compressed air to the lubricant pump.

According to one possible variant, a drill according to the invention comprises a lever fixedly attached to said ring or said planet carrier and acting on said valve, said lever being mobile between at least:
an open position of said valve, said position being taken when said ring or said planet carrier is situated in a position under the effect of a torque exerted on said spindle of a value at least equal to a predetermined threshold, and
a closed position of said valve, this position being taken when said ring or said planet carrier is situated in a position under the effect of a torque exerted on said spindle of a value below said predetermined threshold.

According to this embodiment, the lever acts directly on the valve to prohibit or permit the circulation of compressed air towards the lubricant pump.

According to one possible variant, the degree of opening of said valve varies according to the torque exerted on said spindle.

The supply or feed flow rate of the lubricant pump and the flow rate of lubricant that it delivers can thus be made to vary as a function of the torque exerted on the spindle which is proportional to the cutting forces. It is then for example possible to increase the lubrication flow rate when the cutting forces increase.

According to one possible variant, a drill according to the invention comprises means for adjusting the setting of said elastic return means.

This adjustment of setting makes it possible to adjust the threshold of activation of the lubrication pump and prevent the lubrication from being activated during idle operation.

According to one possible variant, said motor is pneumatic, said drill comprising at least one compressed air supply channel for said motor to which there is connected at least one compressed air supply channel for said pump, said valve being disposed along the compressed air supply channel of said pump.

The compressed air supply circuit of the motor then serves also to feed the lubrication pump, thus simplifying the architecture of the drill.

5. LIST OF FIGURES

Other features and advantages of the invention shall appear from the following description of particular embodiments given by way of simple illustrative and non-exhaustive examples and from the appended drawings, of which:

FIGS. 3 and 4 illustrate a first embodiment of means for determining at least one piece of information representing the torque exerted during drilling on the spindle as well as means to control the flow rate of the pump of a drill according to the invention;

6. DESCRIPTION OF PARTICULAR EMBODIMENTS

Figure 1:
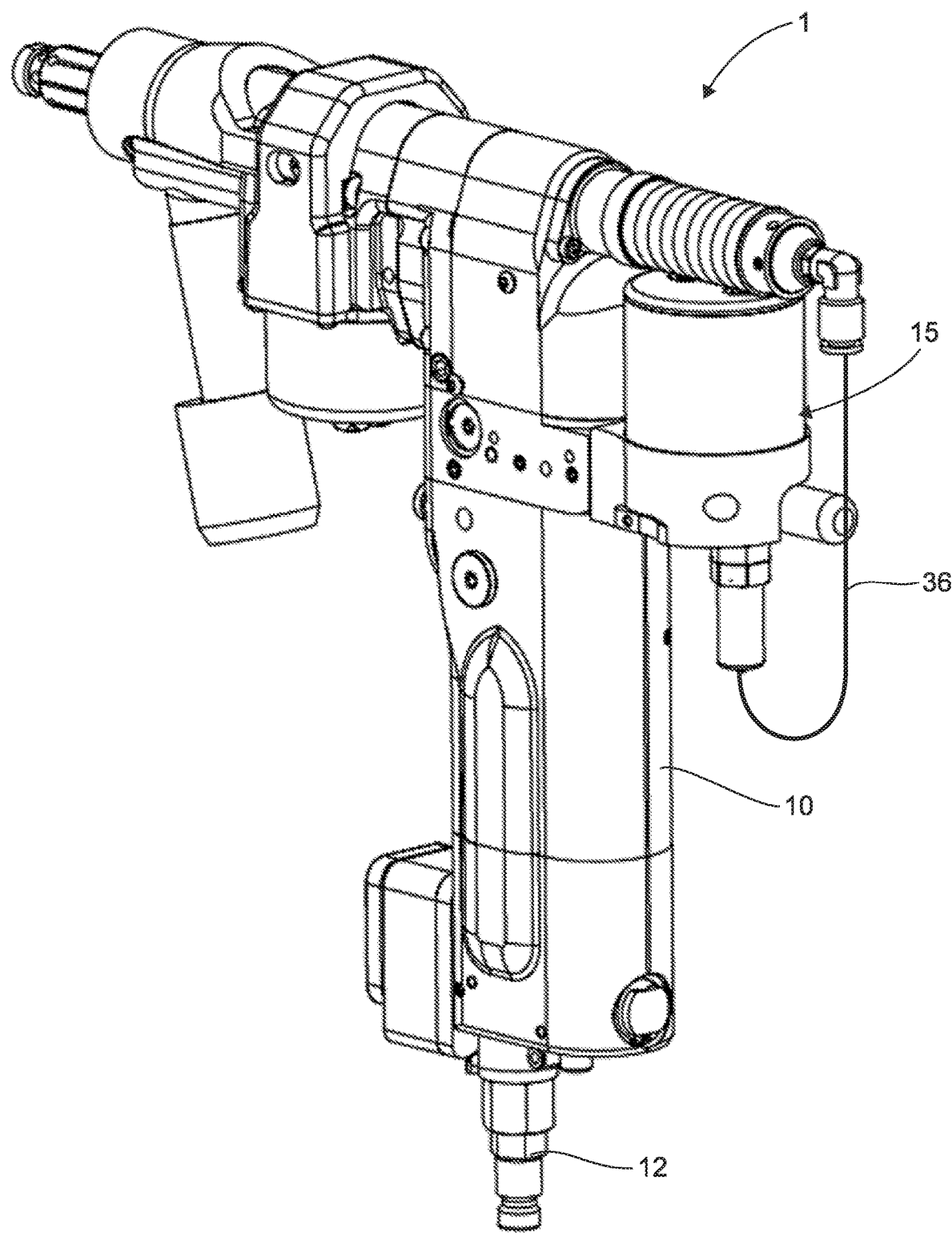
FIG. 1 illustrates a view in perspective of an example of a drill according to an exemplary embodiment of the invention.

6.1. First Embodiment: Rod for Closing Off Supply Channel of the Lubrication Pump Referring to FIGS. 1 to 4, we present a first embodiment of a drill according to the invention.

Here, this is an automatic feed drill, i.e. a drill in which the drilling spindle is liable to be driven in rotation and in translation simultaneously along its longitudinal axis. The invention however can be implemented for any type of drill.

As represented, the drill 1 comprises a casing 10 housing a motor 11. In this embodiment, the motor 11 is of a pneumatic type. It comprises a rotor 110. The casing 10 comprises a connection inlet 12 for connection to a compressed air supply conduit (not shown) to feed the motor.

The casing 10 also houses a drill spindle 13 at the end of which affixing means (not shown) enable a cutting tool such as the drill bit 14 to be fixedly attached to it. Such means are known per se to those skilled in the art and are therefore not described in greater detail herein.

The casing 10 comprises a transmission T, the input E of which is connected to the rotor 110 of the motor 11 and the output S of which is connected to the spindle 13.

This transmission T classically comprises a set of components capable of converting a movement of rotation of the rotor 110 of the motor 11 into a combined movement of rotation and translation of the drilling spindle 13 along its longitudinal axis. The rotation frequency of the spindle 13 and its feed rate are proportional to the rotation frequency of the rotor 110.

In the example illustrated, the axis of the rotor 110 and that of the spindle 13 are orthogonal. In one variant, they could be parallel.

The drill 1 comprises means for distributing lubricant to the cutting tool 14 fixedly attached to the end of the spindle 13.

These means of distribution comprises a mechanical pump 15 capable of delivering a lubricant in a lubricant distribution channel 130 passing through the spindle 13 and leading into the cutting tool 14, this cutting tool 14 being also crossed by a through channel (not shown).

This pump 15 is supplied with a part of the compressed air feeding the motor 11. To this end, the drill 1 comprises a compressed air supply channel 16 for the lubricant pump 15, this channel 16 (represented only in part) being connected to the supply channel 17 for the motor 11 of the drill 1. The supply channel 17 of the motor comprises a regulation valve 170.

A valve 18 for supplying compressed air to the pump 15 is placed along the compressed air supply channel 16 for the pump 15. This valve 18 comprises a piston 180 and a cylinder 181 with an outlet hole 182, the piston 180 being mobile within the cylinder 181 between at least:

a closed position in which the outlet hole 182 of the valve 18 is closed so that the pump 15 is not supplied with compressed air, and an open position in which the outlet hole 182 of the valve 18 is open so that the pump 15 is supplied with compressed air to distribute lubricant in the distribution channel 130.

A compression spring 183 acts on the piston 180 to bring it into its closed position.

The drill comprises a cycle start button 19, which, when pressed down by an operator, launches a drilling cycle according to a pre-programmed strategy.

Once a start of a drilling cycle is launched, air is let into the drill via the connection 12 to supply compressed air to the motor 11 according to a predetermined drilling strategy through the channel 17 and the valve 170.

A part of the compressed air entering the drill 1 is deflected to feed the channel 16 for supplying compressed air to the lubricant pump 15. This air is permitted or not permitted to supply the pump 15 depending on the state in which the valve 18 is situated.

The drill 1 comprises mechanical elements( ) for determining at least one piece of information representing the torque exerted on the spindle 3 along its axis during drilling. As will be seen more clearly here below, these elements for determining make it more particularly possible to achieve an evaluation of the torque exerted on the spindle 13 along its axis during a drilling, rather than determining its value. They make it possible especially to detect an increase or a diminishing of the torque and the attaining, by this torque, of a predefined threshold value.

Control element(s) act on the flow rate of the pump 15 according to the torque exerted on the spindle 13 along its axis during drilling.

The regulation of the flow rate of the pump 15 can then be of an all-or-nothing type. In this case, the valve 18 is either open or closed. As alternative, this regulation can enable the flow rate of the pump 15 to be varied gradually. It is thus possible to pass either from a zero flow rate to a given flow rate or from a zero flow rate to a variable flow rate.

The transmission T herein comprises a spur gear 20 rotationally linked with the rotor 110 and engaged with another spur gear 21 itself rotationally linked with the sun gear 22 of an epicyclic gear train. This epicyclic gear train comprises a row of planet gears 23 engaged with the sun gear 22 and mounted on a planet carrier 24. This planet carrier 24 is rotationally linked with a shaft 26. The planet gears 23 engage with the spur gear 27 of the epicyclic gear train. The shaft 26 is rotationally linked with a first bevel gear 28. This conical gear 28 is engaged with a second conical gear 29 which is the input of one part of the transmission T configured to drive the drill spindle 13 in rotation and in translation simultaneously along its axis. This type of transmission is known per se to those skilled in the art and is therefore not described in greater detail here.

The mechanical elements for determining at least one piece of information representing the torque exerted on the spindle 13 along its axis during drilling are placed in the transmission T.

More specifically, the ring 27 is rotationally mobile within the casing 10 of the drill 1 between two extreme positions against the action of the elastic return. To this end, needle bearings 30 or ball bearings or any other means of suitable rotational guidance are interposed between the ring 27 and the casing 10 of the drill 1. The rotation of the ring 27 is immobilized by a spring 31 such that when the cutting forces on the drilling bit 14 increase, the load that the spring 31 must bear to rotationally immobilize the ring 27 increases, prompting a compression of the spring 31 and therefore a rotation of the ring 27. The epicyclic train with floating ring gear under stress from the spring thus acts as a feeler gauge capable of evaluating the torque supported by the drill bit at the level of the spindle and resulting from the cutting forces in material.

The ring 27 bears a reaction torque proportional to its output torque and therefore proportional to the torque borne by the drill bit at the spindle and resulting from the cutting forces in the material.

A rotation of the ring 27 against the action of the elastic return 31 under the effect of an increase of the torque exerted on the spindle 13 is accompanied by a shifting of the valve 18 towards its open position, and vice versa.

To this end, the ring 27 is for example fixedly attached to a lever 32 supported against a first extremity of a compression spring 31, the other extremity of this compression spring being immobilized within the casing 10. This extremity can be immobilized by means of a screw 33 which could be screwed into the casing 10 to a greater or lesser extent to calibrate the spring 31 in order to adjust the torque that has to be absorbed by the spindle 13 so that it rotates sufficiently for the valve to open.

The spring can be calibrated so that the rotation of the ring is not activated except from a given level of torque onwards, through the spring 33 that is accessible to the technician in charge of adjusting the tools.

The calibration of the spring is aimed at compensating for the friction of the pinions and the seals of the valve or again of the equipment and at preventing the lubrication from being activated in idle operation.

A closing-off finger or rod 34 driven by the ring 27 closes off or releases the channel 16 for supplying compressed air to the pump 15 upstream to the valve 18.

In this embodiment, this closing-off finger 34 is a rod linked to the ring 27 by a slider link 35 having an axis essentially orthogonal to the rotation axis of the ring 27 and the axis of the rod 34. This rod 34 therefore moves when the ring 27 rotates within the casing 10 so that its extremity 340 closes off or releases the channel 16 for supplying compressed air to the pump 15 upstream to the valve 18.

More specifically, the rod 34 is sized such that when the ring 27 moves rotationally on an angular range corresponding to the attaining by the torque to which the spindle 13 is subjected, of a predetermined threshold value, then the extremity 340 of the rod 34 occupies a position of release in which it releases the supply channel 16 of the lubricant pump 15 so that this pump is supplied with compressed air and delivers the lubricant. Below this threshold value, the extremity 340 of the rod 34 is in a closing position in which it closes off the supply channel 16 in such a way that the lubricant pump 15 is not supplied with compressed air and does not deliver any lubricant.

In other words, the rod 34 is mobile between at least:
an open position of the supply channel 16 of the pump 15, this position being taken when the ring 27 is in a position under the action of a torque exerted on the spindle 13 with a value at least equal to a predetermined threshold corresponding to the effective performance of a drilling action on a part (removal of material), and
a position of closing off the supply channel 16 of the pump 15, this position being taken when the ring 27 is situated in a position under the effect of a torque exerted on the spindle 27 with a value below that of said predetermined threshold.

When the rod 34 releases the circulation of compressed air in the supply channel 16 of the lubricant pump 15, the compressed air acts first of all on the valve 18 to shift its piston 180 in the cylinder 181 from its closed position to its open position, thus allowing compressed air to be conveyed towards the pump 15 through the exit hole 182 and the channel 16.

The pump 15 comprises a cylinder 151 in which there is mounted a piston 152, mobile in translation, the axis 153 of which is crossed by a channel 154 leading out by means of a hole 155 into the cylinder 150 of one side of the piston 152. The compressed air supply channel 16 for the pump 16 leads into the channel 154 passing through the axis of the piston 152 of the pump 15. On the other side of the piston 152, the cylinder 151 contains lubricant.

Thus, once the torque exerted on the spindle 13 during a drilling operation reaches a threshold value corresponding to the effective performance of a drilling, the ring 27 reaches a position in the casing 10 in which the rod 34 occupies its open position (or position of release) and thus enables compressed air to place the valve 18 in its open position so much so that the compressed air flows into the supply channel 16 for the pump 15 and then into the channel 154 passing through the axis of the piston 152 of the pump 15 to get shed into the cylinder 151 on that side of the piston that communicates with the hole 155 of the pump 15 and so as to shift the piston 152 therein. Under the action of the shifting of the piston 152 towards the part of the cylinder 151 that contains the lubricant, the lubricant flows through the exit 156 of the cylinder 151 and, through a conduit 136, reaches the distribution channel 130 passing through the spindle 13 until it feeds the drill bit 14. The lubricant then flows into the drilling zone through the drill bit 14.

If a drilling action, i.e. a removal of material:
has not begun, which means that the drill bit 14 is in the phase of approaching the part to be drilled,
or if it has been completed, for example in a through-drilling exit of the drill bit 14 out of the drilled part, or else the if the drill bit 14 withdraws from a bore that has been made, the torque exerted on the spindle 13 is not sufficient to move the ring 27. The rod 34 remains in its closing-off position. The lubricant pump 15 is then not fed with compressed air and does not deliver any lubricant.

The piston 180 of the valve 18 can include a button 184 enabling an operator to open or close the valve manually to test the lubricant pump.

Figure 5:
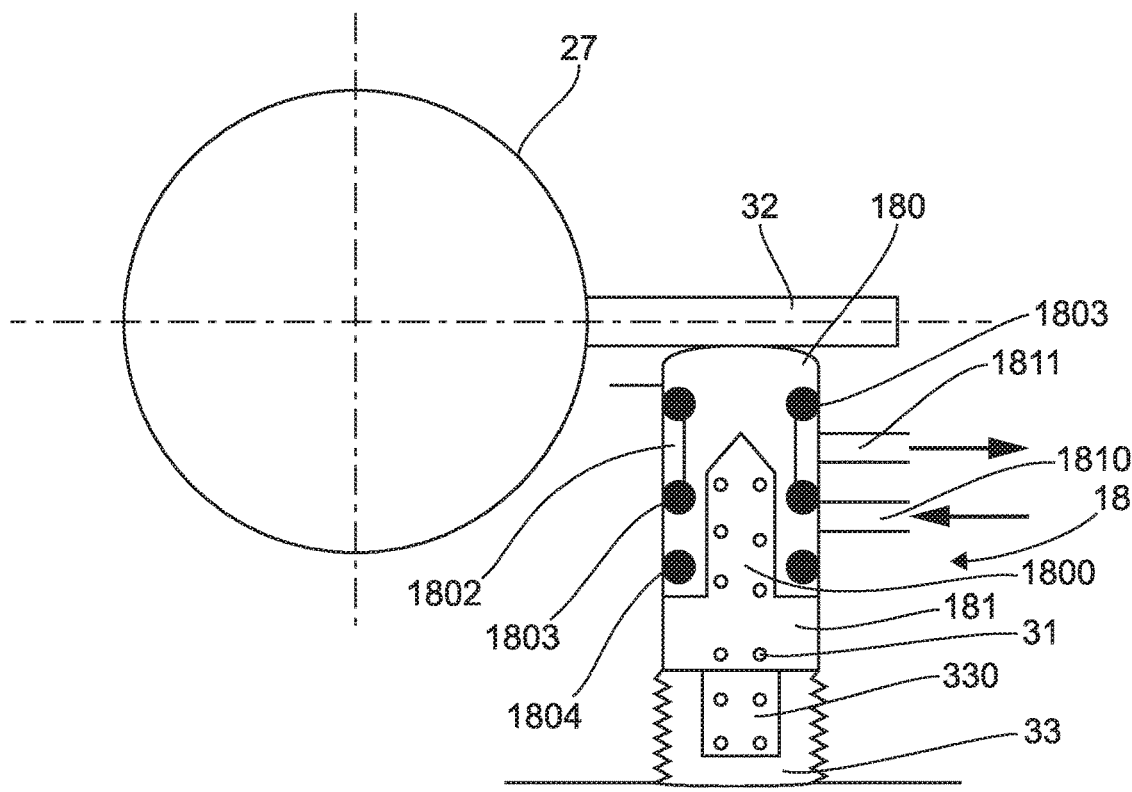
FIG. 5 illustrates a second embodiment of means for determining at least one piece of information representing the torque exerted during drilling on the spindle as well as means to control the flow rate of the pump of a drill according to the invention.

6.2. Second Embodiment: Finger Acting on the Valve without Modulation of Flow Rate Referring to FIG. 5, we present a second embodiment in which the lever 32 fixedly attached to the ring 27 acts directly on the piston 180 of the valve 18 to shift it from one of its positions, open or closed, to the other.

Only the main differences between the first and second embodiment are described here below.

The valve 18 herein comprises a cylindrical piston 180 within which there is made, along its longitudinal axis, a blind hole 1800 housing one extremity of a spring 31, the other extremity of this spring being housed in a housing 330 provided for this purpose in a setting screw 33.

The piston 180 is mobile in translation in a cylinder 181. It comprises a circumferential groove 1802 on either side of which are disposed two O-rings 1803. Another O-ring 1804 is placed around the piston 181 upstream to the O-rings 1803.

The lever 32 is mobile between at least:
a position of opening the valve 18, this position being taken when the ring 27 is situated in a position under the action of a torque, exerted on the spindle 13, of a value at least equal to a predetermined threshold corresponding to the effective performance of an action for drilling a part (removal of material), and
a position of closing the valve 18, this position being taken when the ring 27 is situated in a position under the action of a torque, exerted on the spindle 13, of a value below said predetermined threshold.

The cylinder 181 comprises an inlet of compressed air 1810 and an outlet of compressed air 1811.

When the valve 18 is in its closed position, the piston 180 is placed in such a way that the inlet of air 1810 of the cylinder 181 leads, between two O-rings 1803, 1804, out of the groove 1802 so much so that the compressed air cannot flow through the outlet 1811 of the cylinder 181 towards the pump 15.

When the valve 18 is in its open position, the piston 180 is placed in such a way that the inlet of air of 1810 of the cylinder 181 leads, between two O-rings 1803, 1804 into the groove 1802 so much so that compressed air can flow through the outlet 1811 of the cylinder 1811 towards the pump 15.

Here, the piston 180 and the spring 130 are coaxial, thus simplifying the solution and making it more compact.

This embodiment has another advantage: the design of the piston 180 is such that the feed pressure of the pump 15 does not generate any axial force on the piston 180 and therefore does not disturb the behavior of the spring 31 which remains subjected to the reaction torque of the ring 27 alone. Indeed, the air pressure is let into a groove 1802 of the piston 180, the faces of this groove 1802 being of equal surface areas and opposite to each other. Thus, the compressed air exerts forces of identical norms and opposite directions on these surfaces. These forces cancel each other out and do not disturb the working of the spring 31 and the detection of the attaining, by the torque to which the spindle is subjected, of a threshold value signifying that the drill bit is in drilling action.

The piston 180 of the valve 18 can include a button (not shown) enabling an operator to open and close the valve manually to test the lubricant pump.

The valve 18 of this embodiment can act as a substitute for or a complement to the valve 18 of the first embodiment and it can happen that this first embodiment will not implement the control elements when the two valves are implemented together.

Figure 6:
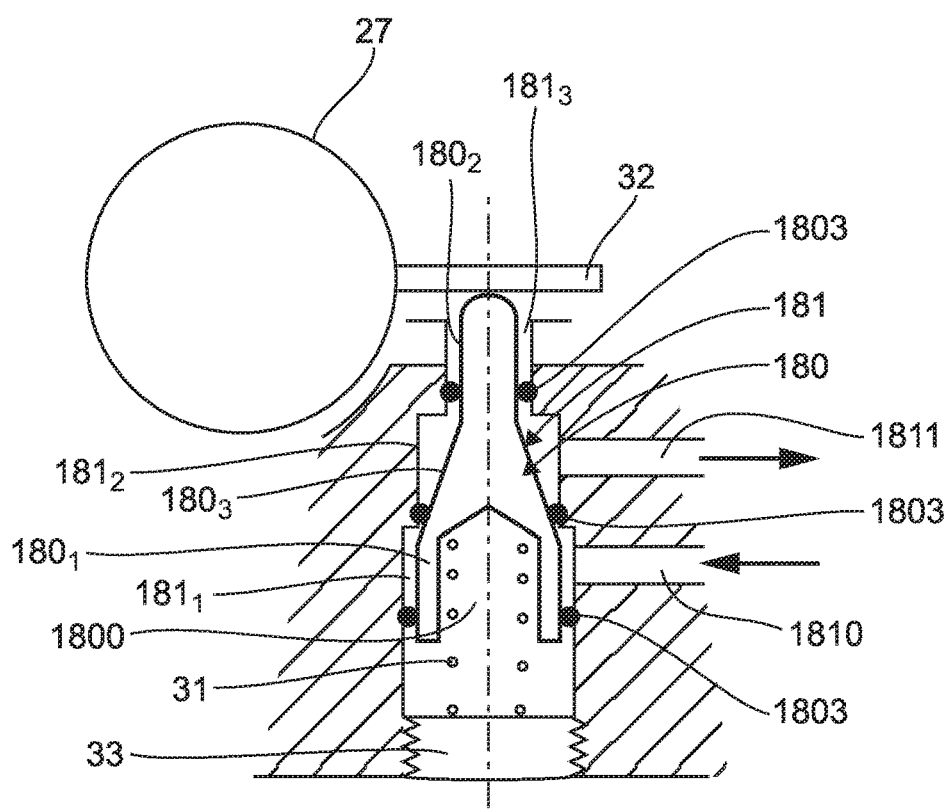
FIG. 6 illustrates a second embodiment of means for determining at least one piece of information representing the torque exerted during drilling on the spindle as well as means to control the flow rate of the pump of a drill according to the invention.

6.3. Third Embodiment: Finger Acting on the Valve with Modulation of Flow Rate Referring to FIG. 6, we present a third embodiment in which the lever 32 acts directly on the position 180 of the valve 18 to shift it from one of its positions, open or closed, to the other as in the second embodiment. However, the flow rate of the pump 15 in compressed air and therefore its lubricant distribution flow are modulated according to the position of the valve 18 as a function of the torque exerted on the spindle 13.

Only the main differences between the first and second embodiments and this third embodiment are described here below.

The valve 18 herein comprises a piston 180 within which a blind hole 1800 is made along its longitudinal axis. This blind hole 1800 houses one extremity of a spring 31, the other extremity of this spring 31 resting against a setting screw 33.

The piston 180 comprises two essentially cylindrical end parts $180_1$, $180_2$ joined by a truncatedly conical part $180_3$.

It carries three O-rings 1803. Two O-rings 1803 are placed about the piston 180 essentially on either side of the truncatedly conical part $180_3$. The other O-ring 1803 is placed at the extremity of one of the cylindrical parts $180_1$.

The piston 180 is mobile in translation in a staged cylinder 181 comprising a part with a large diameter $181_1$ essentially housing the cylindrical part $180_1$ with a large diameter of the piston 180 and a part with a smaller diameter $181_2$ essentially housing the truncatedly conical part $180_3$ of the piston 180. It is crossed by a passage $181_3$ for the cylindrical small diameter part $180_2$ of the piston 180, this passage housing one of the O-rings 1803.

The lever 32 is mobile between at least:
an open position of the valve 18, this position being taken when the ring 27 is situated in a position under the action of a torque exerted on the spindle 13 with a value at least equal to a predetermined threshold corresponding to the effective performance of a action for drilling a part (removal of material), and a closed position of the valve 18, this position being taken when the ring 27 is situated in a position under the action of a torque exerted on the spindle 13 with a value below said predetermined threshold.

The cylinder 181 comprises an inlet of compressed air 1810 that leads into the part with a large diameter 181$_1$ of the cylinder 181 and an outlet of compressed air 1811 that leads into the part with a small diameter 181$_2$ of the cylinder 181.

When the valve 18 is in its closed position, the piston 180 is placed so that the air inlet 1810 of the cylinder 181 leads between the O-rings 1803 situated on either side of the cylindrical part with a large diameter 180$_1$ of the piston 180 so much so that the compressed air cannot flow through the exit 1811 of the cylinder 181 towards the pump 15. The pump 15 then does not deliver any lubricant.

When the valve 18 is in its open position, the piston 180 is placed so that the air inlet 1810 of the cylinder 181 leads outs between two O-rings 1803 placed on either side of the truncatedly conical part 180$_3$ of the piston 180 so that the compressed air can flow through the exit 1811 of the cylinder 181 towards the pump. The pump 15 then delivers lubricant.

Given the implementation of the piston 180 with the truncatedly conical portion 180$_3$, this valve 18 enables the modulation, as a function of cutting forces, of the feed flow rate for the lubricant pump 18 and thus the flow rate of distribution of lubricant.

Indeed, the greater the cutting forces during a drilling operation, the greater the shifting of the ring 27 within the casing 10 and the greater the extent to which the finger 34 depresses the piston 180 in the cylinder 181. The section of passage of compressed air in the valve 18 is then all the greater as the cutting forces are great. It is thus possible to vary the level of lubrication appreciably proportionately to the cutting forces.

This solution could make it possible to vary the lubrication flow rate according to the material drilled.

Indeed, drilling in titanium generates greater cutting forces than in aluminum alloy and requires greater lubrication. This design would enable a greater flow rate of lubrication for materials that give rise to greater cutting forces.

The piston 180 of the valve 18 can include a button (not shown) enabling an operator to open or close the valve by hand to test the lubricant pump. The valve 18 of this embodiment can act as a substitute for or a complement to the valve 18 of the first embodiment. It can happen that this embodiment will not implement the control elements when the two valves are implemented together.

6.4. Fourth Embodiment: Mobile Planet Carrier to Regulate the Flow Rate of the Pump Referring to FIGS. 7-18, we describe another embodiment of the invention.

Only the main differences between this embodiment and the preceding embodiments are described here.

Figure 7:
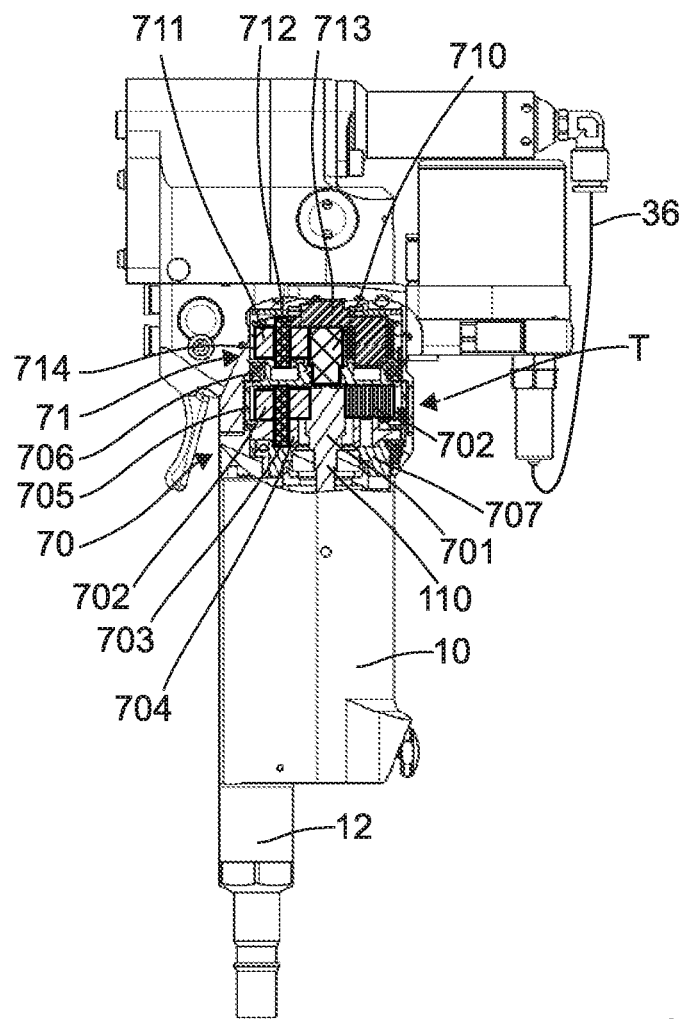
FIGS. 7-18 illustrate another embodiment in which the planet carrier of said epicyclic train of the transmission is mounted so as to be rotationally mobile against the effect of a compression spring to evaluate the torque applied to the spindle.
Figure 8:
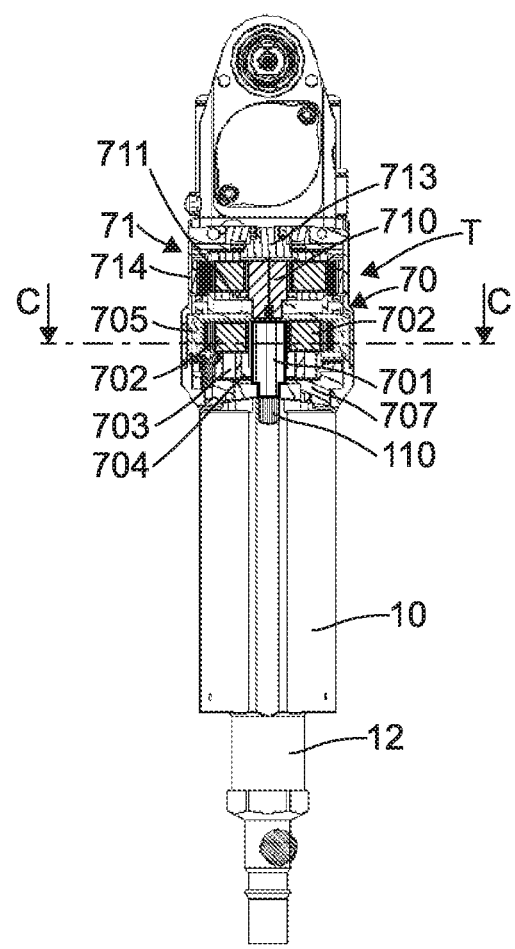

FIG. 7 illustrates a partial view in section of a drill according to an exemplary embodiment of the invention showing the reduction gear situated at exit from the pneumatic motor.

In this embodiment, the transmission T comprises a first epicyclic stage 70 and a second epicyclic stage 71. These two stages are placed between the rotor 110 and the set of components capable of converting a rotational movement of the rotor 110 of the motor 10 into a combined rotation and translation movement of the drilling spindle 13 along its longitudinal axis.

The first stage 70 comprises a first sun gear 701 fixedly attached in rotation to the rotor 110. This first sun gear 701 is engaged with the first planet gears 702 mounted so as to be mobile in rotation on two shafts 703 fixedly attached to the first planet carrier 704.

The first planet gears 702 are engaged with a first ring gear 705 mounted so as to be mobile in rotation within the casing 10 by means of a bearing 706, for example a ball bearing.

The first ring gear 705 is fixedly attached in rotation to the second sun gear 710 of the second epicyclic stage 71.

The second sun gear 710 is engaged with second planet gears 711 mounted so as to be mobile in rotation on shafts 712 supported by a second planet carrier 713. The second planet gears 711 are also engaged with a second ring gear 714 mounted so as to be fixed in the casing 10.

Figure 2:
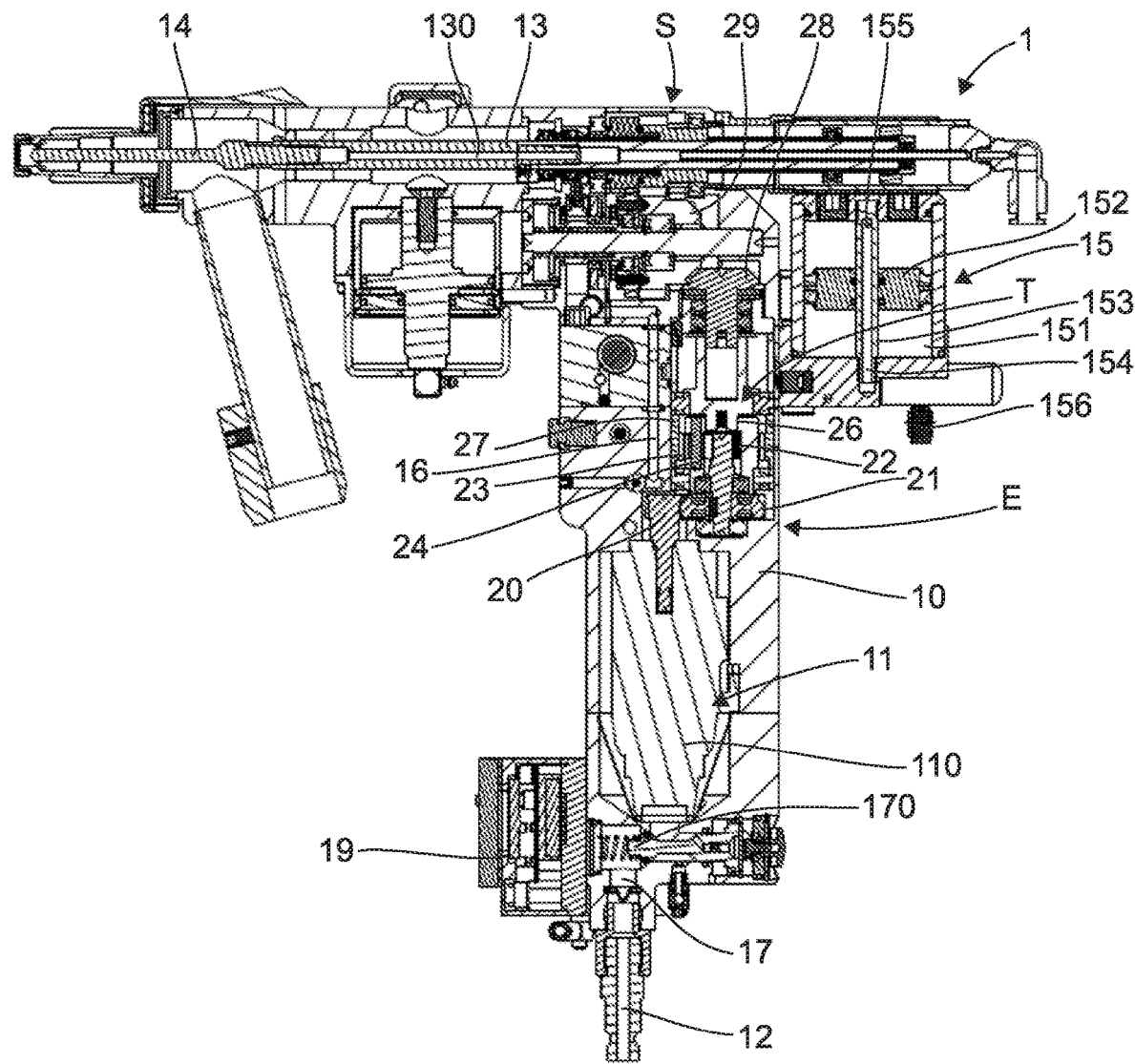
FIG. 2 illustrates a view in section along a transversal plane of the drill of FIG. 1.

The second planet carrier 713 is rotationally linked with the first conical gear 28 (see FIG. 2).

The first planet carrier 704 is mounted on a plate 707 fixedly mounted in the casing 10.

Figure 9:
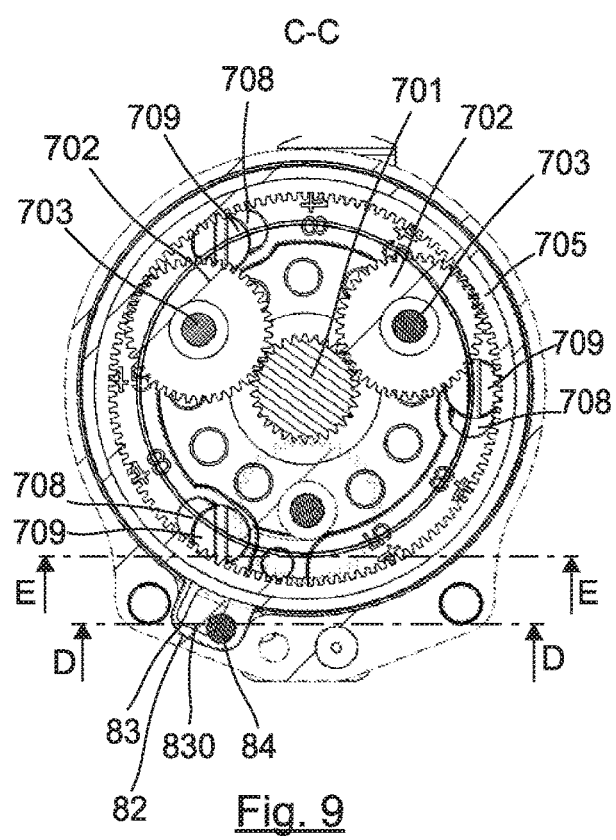
Figure 10:
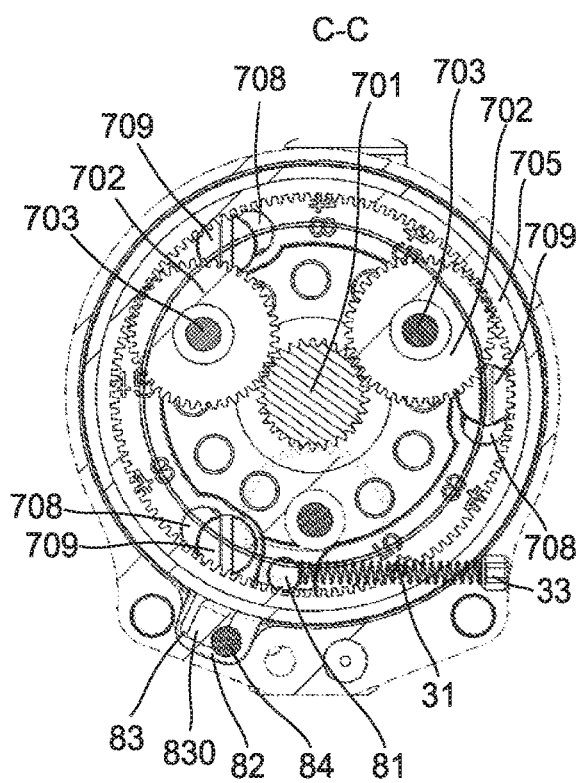
Figure 11:
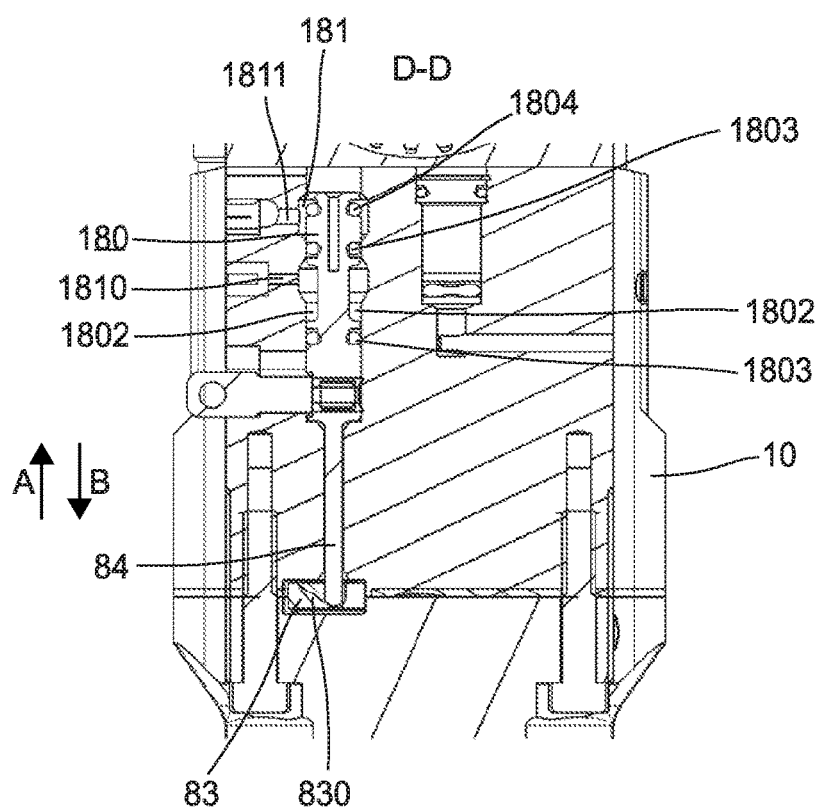
Figure 12:
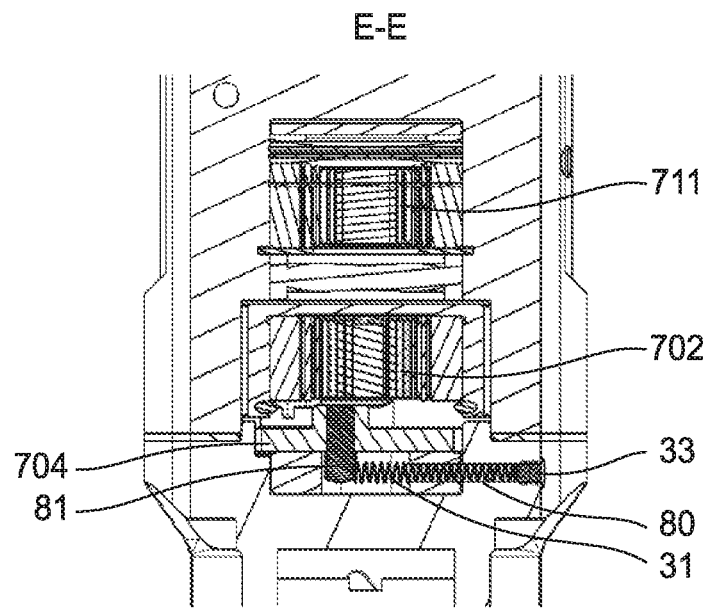
Figure 13:
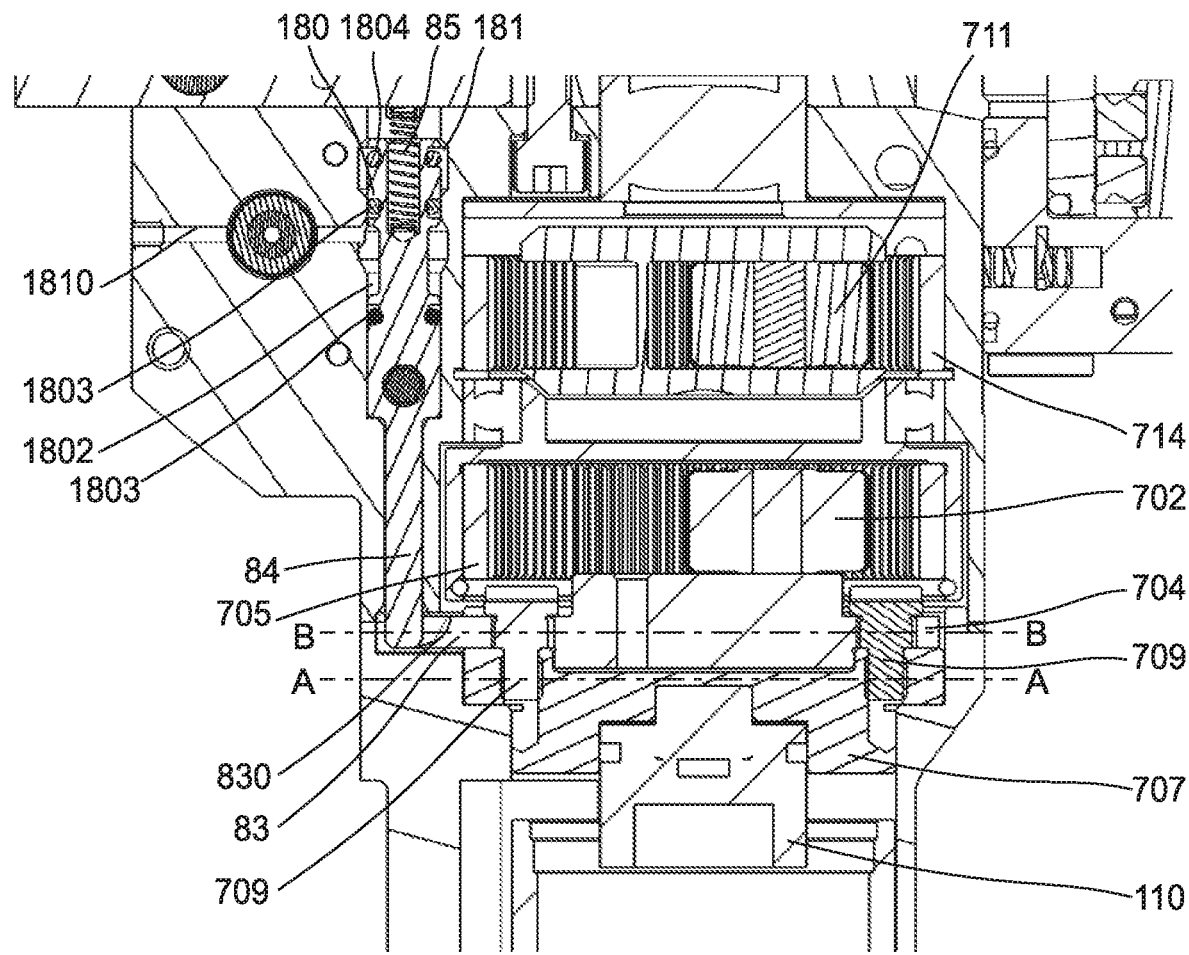
Figure 14:
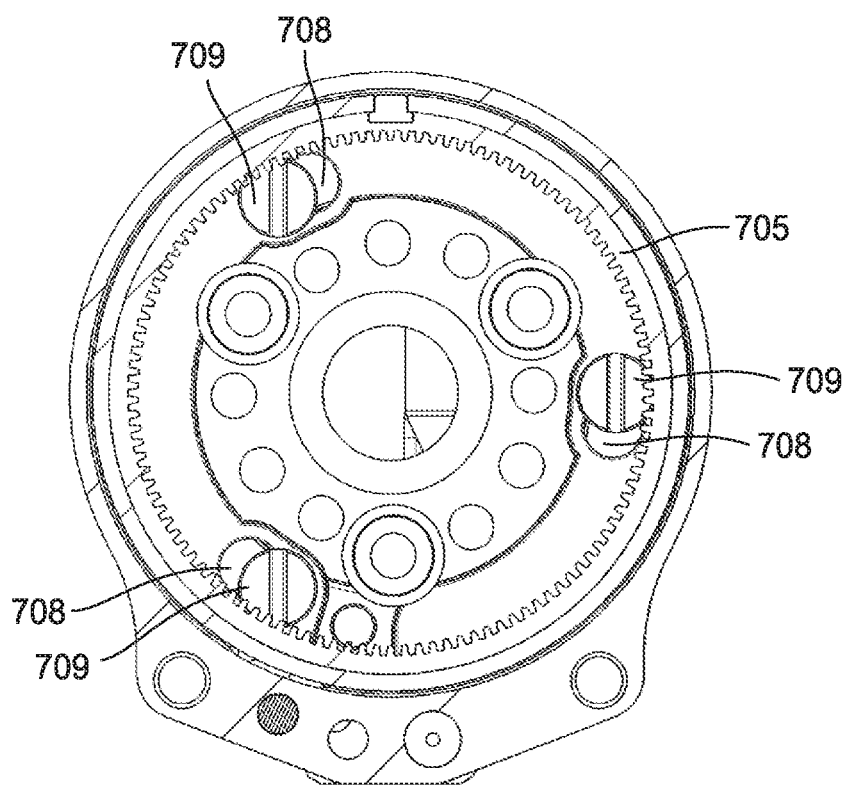
Figures 15, 16:
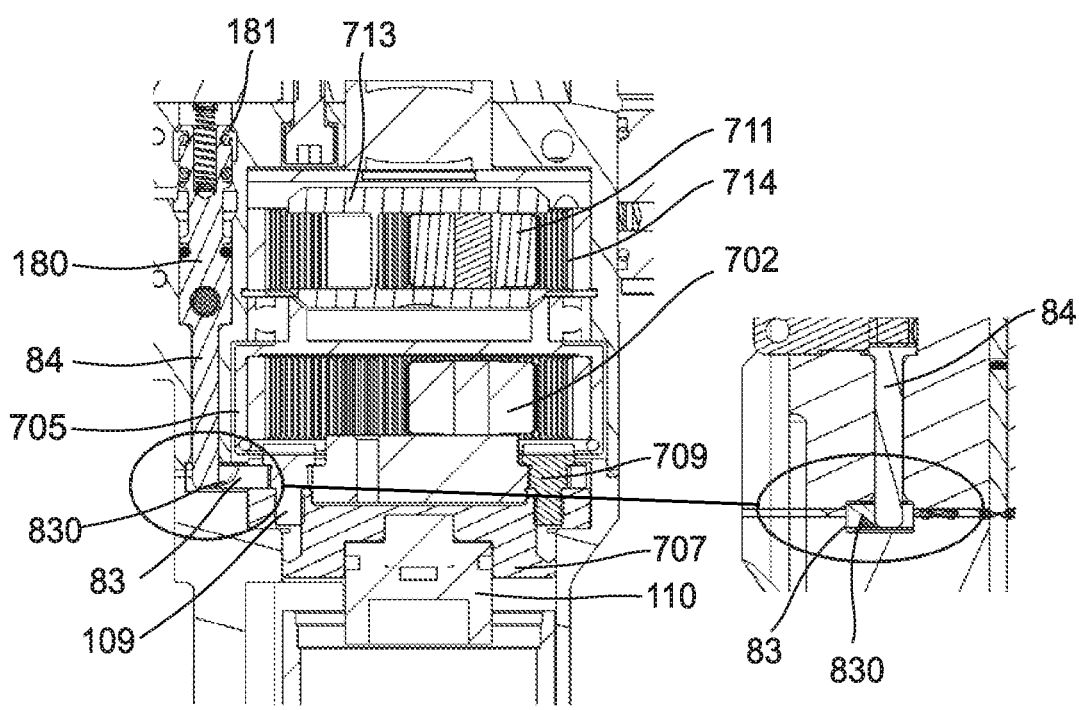
Figure 17:
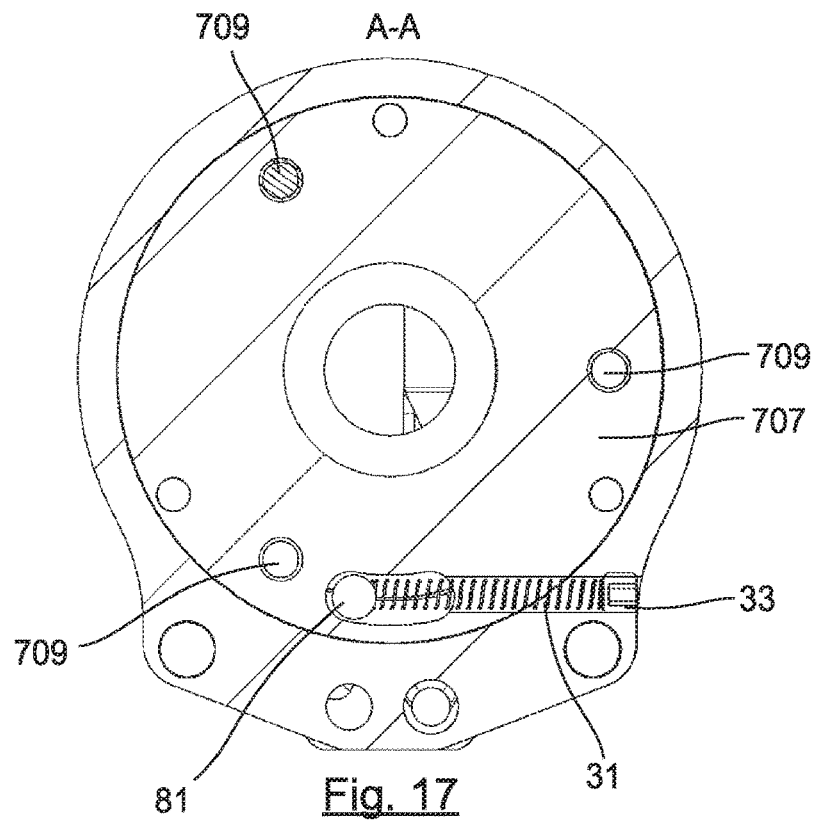
Figure 18:
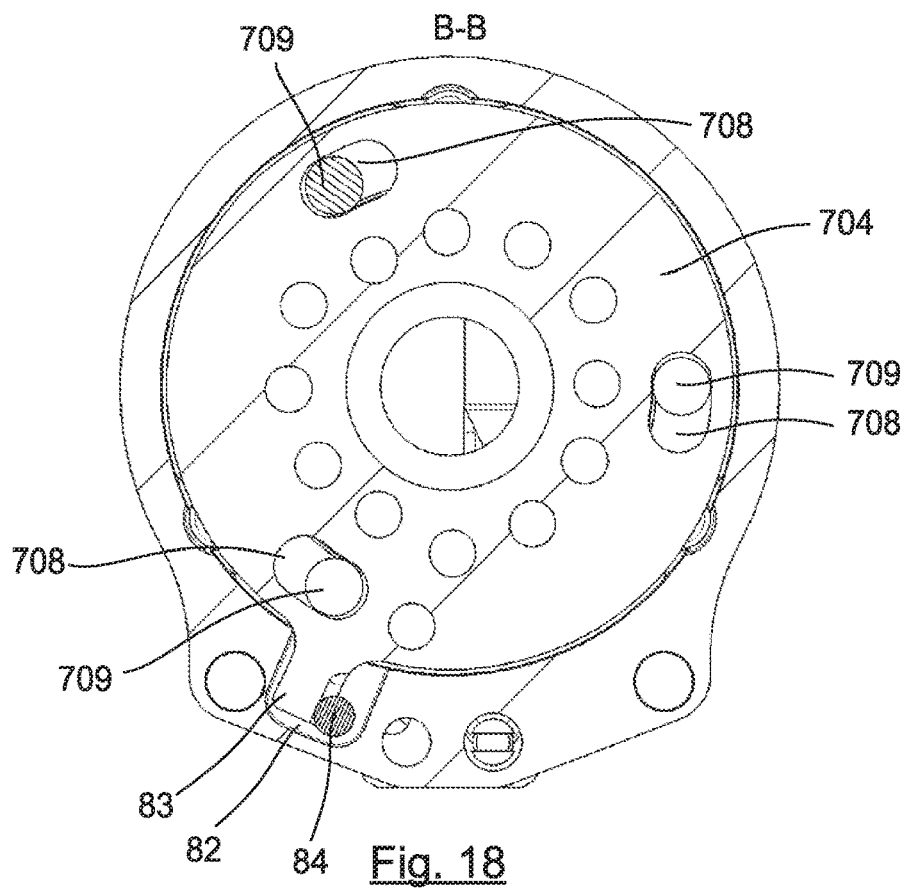

As is depicted in FIG. 9, the first planet carrier is traversed by two oblong grooves 708 that are uniformly distributed and extend about the rotational axis of the first planet carrier 704.

These oblong grooves 708 each enable the passage of a washer-head type screw 709 enabling the linking in translation, along the axis of the motor, of the first planet carrier 704 to the fixed plate 707 while at the same time enabling it to rotate relative to the fixed plate 707 about its axis of rotation which is parallel to the axes of rotation of the first planet gears 702 within the limit of the angular range of shift demarcated by the lateral walls of the grooves 708.

A compression spring 31 passes through a hole 80 that extends through the casing 10 and the fixed plate 707. This spring 31 is interposed between a setting screw 33, the head of which extends to the surface of the casing 10, and a stud 81 fixedly attached to the first planet carrier 704.

The first planet carrier 704 comprises a lateral projecting feature 83 that extends into a reserved space 82 made for this purpose in the casing 10. This lateral projecting feature 83 has an inclined driving ramp 830.

The piston 180 of the valve 18 is extended by a rod 84, the extremity of which is supported against the lateral projecting feature 83.

The first planet carrier 704 is thus mounted so as to be mobile in rotation within the casing 10 against the effect of the compression spring 31.

Thus when, during a drilling operation, the reaction torque experienced by the first planet carrier 704, which is proportional to the torque experienced by the drill bit due to the cutting forces, surpasses a predetermined threshold value corresponding to the effective performance of a drilling operation, the spring 31 gets compressed and the first planet carrier 704 rotates relative to the fixed plate 707. During this motion, the lateral projecting feature 83, which is fixedly attached to the first planet carrier 704, also rotates in the reserved space 82 so much so that the extremity of the rod 84 of the piston 180, held in contact against the ramp 830 by means of a spring 85, slides against the surface of the ramp 830.

This ramp 830 enables a movement of rotation of the first planet carrier 704 to be converted into a translation motion of the piston 180. Indeed, when the first planet carrier 704 rotates relative to the fixed plate 707 under the effect of an increase in the cutting forces experienced by the drill bit, the ramp 830 tends to shift the piston 180 along the arrow A to open the valve 18, making the air inlet 1810 and the air outlet 1811 communicate through the groove 1802. Conversely, when the first planet carrier 704 rotates relative to the fixed plate 707 under the effect of a decrease in the cutting forces experienced by the drill bit, the ramp 830 tends to shift the piston 180 along the direction of the arrow B to close the valve 18 in cutting off communication between the air inlet 1810 and the air outlet 1811.

The floating planet carrier system can be implemented instead of the floating ring gear system in the three preceding embodiments described with reference to the floating ring gear (closing-off rod and finger with or without a modulation of flowrate).

6.4. Advantages

The technique according to an exemplary embodiment of the invention makes it possible, according to either of the embodiments, to deliver lubricant to the drill bit only when it is in the action of drilling (removal of material) but not when the drill is working idly or during the approach, retraction and through-drilling exit phases. Thus, the consumption of lubricant is limited solely to the phases that require it. Polluting the drilling zone and having to implement cleansing campaigns to remedy pollution are averted. The technique according to an exemplary embodiment of the invention thus reduces the costs inherent in the lubrication of a drill bit during a drilling operation.

The technique according to the third embodiment furthermore makes it possible to adapt the lubrication flow rate to the cutting forces so as to increase the flow rate of lubrication during the drilling of materials that induce greater cutting forces and require greater amounts of lubricant.

An exemplary embodiment is aimed especially at providing an efficient solution to at least some of the different problems of the prior art.

In particular, an embodiment optimizes the lubrication of the cutting tool implemented by a drill during a drilling operation.

An embodiment procures a technique of this kind that makes it possible to limit the consumption of lubricant.

An exemplary embodiment limits the pollution of the drilling area by lubricant.

An exemplary embodiment makes it possible to stop the lubricant outside the effective drilling phases, i.e. to stop the lubrication during the approach, withdrawal and through-drilling exit phases.

An exemplary embodiment makes it possible to regulate the lubrication, as a function of the cutting forces borne by a cutting tool, during a drilling operation simply, reliably, robustly and efficiently.

An exemplary embodiment makes it possible to adjust the activation threshold for the lubricant.

Although the present disclosure has been described with reference to one or more examples, workers skilled in the art will recognize that changes may be made in form and detail without departing from the scope of the disclosure and/or the appended claims.

The invention claimed is:

1. A drill comprising:
   a drilling spindle capable of driving a cutting tool in movement;
   at least one channel for distributing a lubricant to said cutting tool;
   a pump to supply said channel with lubricant;
   a control element for controlling a flow rate of said pump; and
   mechanical elements, which determine at least one piece of information representing the torque exerted on said spindle along its axis during drilling, said control element being arranged to act on the flow rate of said pump as a function of the torque exerted on said spindle along its axis during drilling.

2. The drill according to claim 1, wherein said mechanical element is configured to evaluate said torque.

3. The drill according to claim 1, wherein said pump is pneumatic and said control element comprises at least one valve for supplying compressed air to said pump, said valve being mobile between at least:
   a closed position in which said pump is not supplied with compressed air, and
   a open position in which said pump is supplied with compressed air to distribute said lubricant in said distribution channel.

4. The drill according to claim 3 wherein said mechanical element is configured to detect the torque attaining a predetermined threshold, said control element acting on said valve to make the valve pass into said open position when the torque exerted on said spindle is at least equal to said predetermined threshold, and vice versa.

5. The drill according to claim 4 wherein a degree of opening of said pump varies appreciably proportionately as a function of said torque.

6. The drill according to claim 1, comprising a motor provided with a rotor and a transmission having an input connected to said rotor and an output connected to said spindle to drive this spindle in motion along its axis, said mechanical element being placed in said transmission.

7. The drill according to claim 6, wherein said pump is pneumatic, said control element comprises at least one valve for supplying compressed air to said pump, the mechanical element comprises an elastic return and said transmission comprises at least one epicyclical gear train provided with a ring, said ring being rotationally mobile within a casing of said drill between two extreme positions against an action of the elastic return, a rotation of said ring against the action of said elastic return, under an effect of an increase in the torque exerted on said spindle, being accompanied by a shift of said valve towards an open position, and vice versa.

8. The drill according to claim 6, wherein said pump is pneumatic, said control element comprises at least one valve for supplying compressed air to said pump, the mechanical element comprises an elastic return and said transmission comprises at least one epicyclic train provided with a planet carrier, said planet carrier being rotationally mobile within a casing of said drill against an effect of the elastic return, a rotation of said planet carrier against the effect of said elastic return under an effect of an increase in the torque exerted on said spindle being accompanied by a shifting of said valve towards an open position, and vice versa.

9. The drill according to claim 6, comprising a channel for supplying compressed air to said pump and a finger driven in motion by a ring or a planet carrier of an epicyclic gear of the transmission, said finger being mobile between at least:
   a position for opening said channel for supplying said pump, this position being taken when said ring or said planet carrier is situated in a position under an action of a torque exerted on said spindle of a value at least equal to a predetermined threshold, and
   a position for closing off said channel for supplying said pump, this position being taken when said ring or said planet carrier is situated in a position under the action of a torque exerted on said spindle of a value below said predetermined threshold.

10. The drill according to claim 6, wherein said pump is pneumatic, said control element comprises at least one valve for supplying compressed air to said pump, the drill further comprising a lever fixedly attached to a ring or a planet carrier of an epicyclic gear of the transmission and acting on said valve, said lever being mobile between at least:

- an open position of said valve, said open position being taken when said ring or said planet carrier is situated in a position under action of a torque exerted on said spindle of a value at least equal to a predetermined threshold, and
- a closed position of said valve, said closed position being taken when said ring or said planet carrier is situated in a position under action of a torque exerted on said spindle of a value below said predetermined threshold.

11. The drill according to claim 6, wherein said motor is pneumatic, said control element comprises at least one valve for supplying compressed air to said pump, and said drill further comprises at least one compressed air supply channel for said motor to which there is connected at least one channel for supplying the compressed air to said pump, said valve being disposed along said compressed air supply channel for said pump.

12. The drill according to claim 1, wherein the mechanical element comprises an elastic return, which has an adjustable setting.

* * * * *